United States Patent
Bokotko et al.

(10) Patent No.: US 7,691,908 B2
(45) Date of Patent: Apr. 6, 2010

(54) EMULSION BASED OIL SIMULANT AND ASSOCIATED METHODS

(75) Inventors: Romuald Bokotko, Gdansk (PL); Francis V. Hanson, Salt Lake City, UT (US); Jan Hupka, Gdansk-Osowa (PL)

(73) Assignee: University of Utah Research Foundation, Salt Lake City, UT (US)

( * ) Notice: Subject to any disclaimer, the term of this patent is extended or adjusted under 35 U.S.C. 154(b) by 1280 days.

(21) Appl. No.: 11/198,864

(22) Filed: Aug. 4, 2005

(65) Prior Publication Data

US 2006/0030628 A1 Feb. 9, 2006

Related U.S. Application Data

(60) Provisional application No. 60/599,270, filed on Aug. 4, 2004.

(51) Int. Cl.
*B01F 3/08* (2006.01)
(52) U.S. Cl. .............................. 516/21; 516/28; 516/29
(58) Field of Classification Search .................. 516/21, 516/28, 29
See application file for complete search history.

(56) References Cited

U.S. PATENT DOCUMENTS

| | | | | |
|---|---|---|---|---|
| 2,422,633 A * | 6/1947 | Petersen | ...................... | 426/602 |
| 4,446,165 A * | 5/1984 | Roberts | ...................... | 426/602 |
| 5,338,485 A * | 8/1994 | Fock et al. | ..................... | 516/29 |
| 2004/0122111 A1* | 6/2004 | Varadaraj et al. | ............... | 516/21 |
| 2004/0194658 A1* | 10/2004 | Konno et al. | .............. | 106/31.26 |

OTHER PUBLICATIONS

Crichton, R.A., "The Management of Sewage Sludge by the Water Industry in England and Wales", Geotechnical and Geological Engineering, 1994, vol. 12, pp. 183-212.*

Acaroglu, M. et al., "An Investigation of the Use of Rapeseed Oil in Agricultural Tractors as Engine Oil," Energy Sources, 2001, 23 (9), pp. 823-830.

Allen, A. et al, "Canola Oil as a Substitute for Crude Oil in Cold Water Spill Tests," Physical Behaviour, Jun. 14-16, 1983, Section I, pp. 1-8, 2001.

United States Environmental Protection Agency, "Contingency Planning," See http://ww.epa.gov/oilspill/conting.htm (printed Feb. 1, 2006), p. 1.

EPA. 40 CFR Part 796—Chemical Fate Testing Guidelines: Subpart D—Transformation Processes: 796.31 00 Aerobic Aquatic Biodegradation, http://www.access.gpo.gov/nara/cfr/waisidx01/40cfr79601.html, accessed 2002, United States Environmental Protection Agency, pp. 91-96.

(Continued)

*Primary Examiner*—Mark Eashoo
*Assistant Examiner*—Peter F Godenschwager
(74) *Attorney, Agent, or Firm*—Thorpe North & Western LLP (57) ABSTRACT

A crude oil simulant is disclosed that is an emulsion of an organic continuous phase, an aqueous dispersed phase, and an emulsifier. To enhance the biodegradability rate of the simulant various strains of bacteria can be added to the aqueous phase. Nutrients can be added to the aqueous phase to increase activity of the bacteria. The components of the simulant of the invention can be mixed under high shear conditions such as 1,000-12,000 reciprocal minutes. The emulsion based oil simulants can be prepared on-site and can be readily tailored to simulant a wide variety of crude oils under various conditions.

18 Claims, 7 Drawing Sheets

OTHER PUBLICATIONS

PPG's Photosol® Photochromic Dyes, Frequently Asked Questions, See http://www.ppg.com/chm~optical/psol/fotofaqs.htm (accessed Jul. 2003), PPG Industries, Inc., pp. 1-2.

Goodman, R.H. et al., "Tracking Buoys for Oil Spills," In 1995 International Oil Spill Conference, Achieving and Maintaining Preparedness, Long Beach, CA, Feb. 7-Mar. 2, 1995/ See also American Petroleum Institute: Washington, D.C., 1995; pp. 1040.

Grierson, I.T., "Use of Airborne Thermal Imagery to Detect and Monitor Inshore Oil Spill Residues During Darkness Hours," Environ. Manage., 1998, 22(6), pp. 905-912.

Merisol Antioxidants BHT Material Safety Data Sheet, Trade Name: BHT, Version date: Sep. 9, 2005, Version 1.0, pp. 1-8.

Newtec Our Product, Microbe-Plus, See http://www.geocities.com/myorganizations/newtec/product.html (accessed Jul. 2003), Newtec: Bio-remediation, Sewer and Water Treatment, pp. 1-2.

Park, M. et al., "The Use of GPS Buoys to Calibrate Altimetric Satellites," In Proceedings of the 7th International Technical Meeting of The Satellite Division of the Institute of Navigation, Part 1, Salt Lake City, UT, Sep. 20-23, 1994. See also Inst. of Navigation, Alexandria, VA, 1994, vol. 1, pp. 221-230.

Plante, A.F.; Voroney, R.P., "Biodegradation and Bioremediation: Decomposition of Land Applied Oily Food Waste and Associated Changes in Soil Aggregate Stability," J. Environ. Qual. 1998, 27 (2), pp. 395-402.

Reed, M. et al, "Evaluation of Surface Drifters for Satellite Tracking of Oil on the Sea," Oceans, Sep. 1987, vol. 19, pp. 1611-1616.

Salvesen, J.; Stong, B.A.; Byers, D.G.; Smith, A.G.; Arnhart, R.; Gaudet, S.; Tomblin, T.G.; Teichman, K.M., "Establishing Optimal Response Strategies Using Real-Time Current Observations: A Local, Cooperative Approach," 1995 International Oil Spill Conference: Achieving and Maintaining Preparedness, Long Beach, CA, Feb. 27-Mar. 2, 1995, pp. 755-759. See also American Petroleum Institute, 1995.

Sraj, R. et al., "Rapidly Biodegradable Hydraulic Fluids on the Basis of Rapeseed Oil," Lubrication Engineering 2000, pp. 34-39.

Sigma-Aldrich MSDS, Brand: Supelco Inc., Product Name: Canola Oil, 1000 MG, Neat, Version 1.0, Date Updated: Dec. 19, 2003, pp. 1-4.

Fisher Scientific MSDS d-Limonene, Purity 98% (gc), Acc#54537, MSDS Creation Date: Jan. 9, 1998, Revision #6 date: Nov. 17, 2004, MSDS Creation Date: Jan. 9, 2004, pp. 1-6.

* cited by examiner

EMULSION BASED OIL SIMULANT AND ASSOCIATED METHODS

RELATED APPLICATIONS

This application claims the benefit of U.S. Provisional Patent Application No. 60/599,270, filed Aug. 4, 2004, which is incorporated herein by reference in it entirety.

FIELD OF THE INVENTION

The present invention relates generally to simulation of oil spills. More particularly, the present invention relates to emulsion type biodegradable oil compositions and associated methods which simulate crude and other oils for evaluation and testing. Accordingly, the present invention involves the fields of chemistry, petroleum engineering, environmental remediation, and environmental engineering.

BACKGROUND OF THE INVENTION

Damage to the environment, wildlife, and public relations of the offending company caused by accidental oil spills can be significant in monetary terms, good will, and lost time. Once an oil spill has occurred, damage can occur over a period of time as the oil drifts or flows from the original spill site. Further, on land the oil can percolate or spread over terrain and through formations over time. The effectiveness, efficiency, and speed of clean-up response efforts can dramatically affect the final outcome of accidental oil spills. Specifically, reduced clean-up times and improved effective clean-up methods can reduce the damage to the environment and costs of clean-up. One effective way of determining how to improve these efforts is through mock oil spills in a controlled environment.

One method of simulating an oil spill is to provide a crude oil substitute to simulate spilled oil. Substitutes such as wood chips, cotton seed hulls, fire-fighting foam, other tracking buoy materials, pure canola oil, and computer simulations (PVT), have been used to approximate oil spill behavior. Unfortunately, the results obtained with these substitutes have not been satisfactory, since the oil simulant should behave like crude oil, i.e. have similar viscosity, density, adhesive/cohesive properties, and at the same exhibit minimal to substantially no negative impact on the environment.

Crude oil has colloidal structure, which affects its properties. The continuous phase typically comprises aliphatic and aromatic hydrocarbons. The dispersed phase is most often composed of asphaltenes or micelles. Asphaltenes are complex, high molecular weight aromatic compounds, which are non-soluble in aliphatic hydrocarbons. The asphaltene particles are stabilized with resins kept in solution by aromatic hydrocarbons. None of the above attempts to simulate crude oil have been successful in providing good approximations of crude oil behavior under spill conditions.

As such, improved materials and methods for simulating oil spills continue to be sought which would avoid the above mentioned problems and would be a beneficial advancement in the industry.

SUMMARY OF THE INVENTION

It has been recognized that improved oil simulants for use in simulating oil spills would be a desirable achievement. In order to obtain a satisfactory hydrodynamic similarity to crude oil, an effective oil simulant can imitate the colloidal structure of crude oil, and satisfy the requirements of similarity with a target crude oil, cost, biodegradability, low toxicity, and low flammability. An emulsion based crude oil simulant of the present invention can include at least an organic continuous phase, an aqueous dispersed phase and an emulsifier each of which are biodegradable and having a composition and content selected to form an emulsion-based oil simulant which simulates a target oil.

In one aspect of the present invention, a method for making an emulsion-based oil simulant can include the organic continuous phase, the aqueous dispersed phase, and the emulsifier under high shear conditions sufficient to form an emulsion.

In one detailed aspect, the organic continuous phase can comprise a vegetable oil or derivative thereof such as an esterified vegetable oil.

In another detailed aspect, the dispersed aqueous phase can include water, bacteria, and nutrients.

In still another detailed aspect of the present invention, the emulsion-based oil simulant can be used to simulate a target oil in a spill or other environment. The emulsion-based oil simulant can be distributed over a preselected terrestrial surface such as a ground surface or a body of water. As the simulant oil contacts the selected surface, at least one simulated oil property can be evaluated such as viscosity, time of dispersion and/or penetration, and effectiveness of remediation efforts, e.g., clean-up materials and methods.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It must be noted that, as used in this specification and the appended claims, the singular forms "a," "an," and "the"

include plural referents unless the context clearly dictates otherwise. Thus, for example, reference to "an emulsifier" includes one or more of such materials, reference to "a biodegradable oil" includes reference to one or more of such oils, and reference to "a mixing step" includes reference to one or more of such steps.

DEFINITIONS

In describing and claiming the present invention, the following terminology will be used in accordance with the definitions set forth below.

As used herein, a "readily biodegradable" substance can breakdown and yield 60% of the theoretical maximum carbon dioxide ($CO_2$) and show a removal of 70% dissolved organic carbon (DOC) within 28 days "which lead to the reasonable assumption that the substance will undergo rapid and ultimate biodegradation in aerobic aquatic environments." See 40 CFR §796, which is incorporated herein by reference and specifically §796.3100 as in force on the date of filing.

As used herein, "biodegradable" is the breakdown of substantially all of an organic compound to $CO_2$, water, the oxides or mineral salts of other elements and/or to products associated with normal metabolic processes of microorganisms within an acceptable period of time such as about 60 days.

As used herein, "simulate" means that one or more relevant properties are sufficiently similar to a target oil to allow testing and evaluation of the simulant in terrestrial applications with a statistically significant correlation to the target oil properties.

As used herein with respect to an identified property or circumstance, "substantially" refers to a degree of deviation that is sufficient so as to be a measurable detraction from the identified property or circumstance. The exact degree of deviation allowable may in some cases depend on the specific context. Thus, for example, "substantially all" of a material leaves either no or only trace amounts of the material. Most often, one or more elements will be completely absent from the composition of interest, rather than a mere change in compositional percentages. Similarly, a "substantially similar" property is one that can be used to effectively approximate behavior of a material sufficient to assess the relevant effect of that property, e.g., rate of percolation or tendency of target oil and simulant oil to fragment or disperse.

As used herein, all chemical and mechanical properties are enumerated at ambient conditions of temperature and pressure unless indicated otherwise, i.e. STP.

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As a non-limiting example of this principle, although canola oil and sunflower oil are listed as vegetable oils each class of oils has unique properties which may make it more or less suitable in a given oil simulant, e.g. emulsified canola oils have shown exceptional results in approximating Alaskan North Slope (ANS) crude oil behavior. It is not the purpose of this specification to exhaustively outline every possible distinction among potentially useful components, but rather to illustrate the principles of the present invention, often with the use of such lists.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 10 to about 50" should be interpreted to include not only the explicitly recited values of about 10 to about 50, but also include individual values and sub-ranges within the indicated range. Thus, included in this numerical range are individual values such as 20, 30, and 40 and sub-ranges such as from 10-30, from 20-40, and from 30-50, etc. This same principle applies to ranges reciting only one numerical value. Furthermore, such an interpretation should apply regardless of the breadth of the range or the characteristics being described.

INVENTION

In accordance with the present invention, an emulsion-based oil simulant can include an organic continuous phase, an aqueous dispersed phase, and an emulsifier. Each of the organic continuous phase, the aqueous dispersed phase, and the emulsifier can be biodegradable. Further, as explained in more detail below each of these components can have a composition and content so as to form an emulsion-based oil simulant which simulates a target oil. Preferably, the crude oil simulant can be non-toxic, non-flammable, and biodegradable.

Component Descriptions

Although a wide variety of emulsifiers can be suitable for use in the present invention, monoglycerols, phospholipids, and combinations of these can effectively serve as emulsifiers. Specific phospholipids which are suitable as emulsifiers in the present invention can include, but are not limited to, phosphatidyl serine, phosphatidyl ethanolamine, phosphatidyl choline, phosphatidyl glycerol, phosphatidyl inositol, diphosphatidyl glycerol. In one detailed aspect of the present invention, the emulsifier can be a naturally occurring phospholipid. Non-limiting examples of suitable naturally occurring phospholipids can include lecithin, cephalin, sphingomyelin, and combinations of these with one another or other emulsifiers. In one embodiment, the emulsifier can comprise a phospholipid or a soybean lecithin. Typically, the emulsifier can be premixed into the organic phase, although this is not always required. The above-listed emulsifiers are generally regarded as safe (GRAS). Any functional amount of emulsifier can be used in the present invention. The preferred amount of emulsifier is about 0.5 wt % to about 10 wt % per weight of the oil phase, and most often from about 0.9 wt % to about 5 wt %, depending on the specific components and target oil.

The organic continuous phase can typically be formed using vegetable oils or their derivatives. In one embodiment, the vegetable oil derivatives can be esterified vegetable oils or their glycerides. In particular, methyl and ethyl esters of vegetable oils may be advantageously used for the organic continuous phase. The vegetable oil can be any suitable oil such as, but not limited to, canola oil, soybean oil, palm oil, cottonseed oil, safflower oil, sunflower oil, corn oil, olive oil, linseed oil, rapeseed oil, and combinations thereof. Esters of fatty acids such as vegetable oils are readily biodegradable and benign to the environment. In one currently preferred aspect, the esters can have a viscosity in the range from about 1 to about 10 mPa·s, and in some cases about 5 mPa·s.

The specific type of oil can be chosen based on the desired target oil, availability, cost and biodegradability. As a general guideline, the continuous organic phase can comprise from about 50 vol % to about 90 vol % of the emulsion based oil simulant, and in some cases can range from about 60 vol % to about 80 vol %. The optimal content can depend largely on the target oil which is being simulated. For example, an about 65 vol % organic phase of canola oil with lecithin as an emulsifier adequately simulates Alaskan North Slope crude oil.

The dispersed aqueous phase can comprise water, and may contain other components that do not unduly interfere with the formation and properties of the emulsion. Deionized water can preferably be used for preparation of the aqueous phase and helps to insure uniformity and predictability in the final product. In one detailed aspect of the present invention, the dispersed aqueous phase can comprise water, bacteria, and nutrients. The aqueous dispersed phase can be present at any functional content. Typically, the aqueous dispersed phase can be present in an amount from about 10 vol % to about 40 vol %, and in some embodiments from about 10 vol % to about 30 vol %. The amount of the aqueous phase can depend on the required properties or particularly rheology of the target oil to be simulated. Emulsion simulants of a lower viscosity can be prepared by dilution of the original, more viscous emulsion, with oil comprising the continuous phase. Alternatively, an emulsion simulant having a higher viscosity can be obtained by dispersing more aqueous phase in the oil. Generally, the pH can be controlled to within about 6.5 to about 7.5 which range is desirable to minimize adverse environmental effects and to allow additional of bacteria and microorganisms to the oil simulant compositions of the present invention.

Microorganisms such as bacteria can be further included in the compositions of the present invention to stimulate biodegradation. The emulsion-based oil simulant can include bacteria in the dispersed aqueous phase to stimulate biodegradation where the bacteria are in sufficient contact with the organic continuous phase for the bacteria to degrade the organic continuous phase. Various strains of bacteria can be added to the aqueous phase to stimulate biodegradation. Suitable bacteria can include, but are not limited to, one or more of *Aspergillus niger, Aspergillus oryzae, Bacillus amyloliquefaciens, Bacillus lichentriformis, Bacillus megaterium, Bacillus polymyxa, Bacillus subtilis, Lactobacillus Acidophilus, Pseudomonas fluorescens, Pseudomonas oleovornes, Pseudomonas putida, Rumenococcus Albus*, and combinations thereof. Bacteria can be obtained commercially (e.g. Microbe-Plus™) or indigenous bacteria can be cultured and grown for the purpose of use with the present invention.

Microorganism nutrients can be added to the emulsion-based oil simulants of the present invention in order to maintain and enhance activity of bacteria. Nutrients can be added either with bacteria or without bacteria, as the nutrients can enhance activity of bacteria which preexists at a simulated spill site. Typical nutrients can include nitrogen, inorganic salts, and/or other additives. In one embodiment, the nutrients can include nitrogen, phosphorous, sulfur, and calcium inorganic salts in the aqueous phase to enhance activity of bacteria. Particularly suitable salts include ammonium chloride ($NH_4Cl$), potassium nitrate ($KNO_3$), monosodium phosphate ($NaH_2PO_4$), dipotassium phosphate ($K_2HPO_4$). Non-limiting examples of additional additives can include magnesium sulfate ($MgSO_4$) as a source of sulfur, and calcium chloride ($CaCl_2$) as a source of calcium.

The addition of nutrients and/or microorganisms to the simulant fluid can be performed during formation of the oil simulant. Optionally, one or both of these components can be used separate from the simulant composition to either pre-treat or post-treat the simulant spill site using the nutrients or microorganisms to increase the biodegradation rate.

Additional additives can be included in either phase of the emulsion-based oil simulants of the present invention. Non-limiting examples of suitable additives can include biodegradable colorants, anti-oxidants, or other additives which increase the usefulness of the composition. For example, food dyes or photochromic dyes can be included to allow effective visual tracking of the simulant oil behavior when applied to a terrestrial surface. The amount of colorant can vary depending on the desired intensity of color and the type of colorant used. However, the amount of colorant in the oil simulants of the present invention can often range from about 0.05 wt % to about 2 wt %.

Methods of Forming Emulsion-Based Oil Simulants

The components of the simulant of the invention may be mixed by any suitable method. Typically, the organic phase is formed by mixing the based organic material and oil soluble components such as the emulsifier. Separately, the aqueous phase can be formed by mixing water soluble components such as antioxidants, additives, colorants, bacteria preparations and/or nutrients. The prepared organic phase and aqueous phase can then be intimately mixed sufficient to form an emulsion. Most often this can be accomplished using a high shear mixer or other intense mixing process. A particularly suitable mixer is a high-speed mixer with rotor/stator workhead, particularly high shear in-line or batch mixer. Suitable speeds of rotation can be in the range 1000-20,000 rpm, although other speeds can be useful depending on the size and type of mixer. The time necessary to form an emulsion can vary depending on the selected components. Further, variation in mixer type/size, mixing time, mixing intensity, and surfactant concentration can affect the droplet size. For example, increasing any of these parameters can decrease the droplet size. Droplet size directly affects simulant properties, especially viscosity. Specifically, an increase in droplet size results in a decrease in the viscosity of an oil simulant. Thus, these parameters can be varied in order to achieve the desired simulant properties which most closely approximate the target oil. As a guideline, suitable mixing time can typically be in the range of about 3 to about 5 minutes.

Another aspect of the present invention is the choice of the relative content of organic and aqueous phases. In one aspect, a method of preparation of emulsion-based crude oil simulant can involve dispersing from about 10 to about 50% by volume of the aqueous phase into about 90 to about 50% by volume of vegetable oil esters containing an emulsifier. A emulsion can be achieved under high shear force field conditions in the range from 1000 to 20,000 reciprocal minutes. The aqueous phase can be about 10 to about 50 vol % with respect to the total volume of the mixture, and is often preferably from about 10 to about 30 vol %. In a preferred embodiment, the dispersing step is formed at high shear force field conditions in the range from 1000 to 12,000 reciprocal seconds.

The resulting emulsion-based oil simulant is in the form of a water-in-oil emulsion. Simulant viscosity, the potential for spreading on land and on water, and biodegradability can be controlled by number of parameters. These parameters are generally not available in a non-dispersed fluid and allow the methods of the present invention much greater freedom and latitude in designing composition which accurately simulate oils such as crude oils. Properties of the oil simulant can be easily adjusted by selection of the oil phase, the aqueous phase, and the kind and concentration of emulsifier. The emulsion undergoes accelerated biodegradation over a wide range of temperature conditions and is suitable for oil spill simulation on terrestrial surfaces such as land, seawater, and freshwater.

Further, the emulsion based simulant compositions of the present invention can simulate the colloidal structure of crude oil in a manner not previously accomplished. The properties of emulsion based oil simulant of the present invention can be easily adjusted by selection of suitable continuous phase, dispersed phase, and emulsifier. Each of these components can be adjusted in type and concentration to achieve a desired physical property such as viscosity, flow aggregation, or other properties relevant to oil spill simulations. The oil simulants of the present invention can also be prepared on site, eliminating stability and degradation concerns during storage and transport. It is also a significant benefit that the emulsion based oil simulant of the present invention is environmentally benign and biodegradable.

Practical and Commercial Applications:

The emulsion based oil simulants of the present invention can be used in a wide variety of applications. For example, such simulants can be useful in terrestrial spreading and transport studies. Specifically, the emulsion based crude oil simulant of the present invention can be used to determine spreading and transport rates of crude oil on various types of soil and vegetation covers with varying slopes, including various conditions of ice and snow. Additionally, the emulsion based oil simulants of the present invention can be useful in studying on-water spreading and transport phenomena on rivers, streams and other water reservoirs. In yet another potential application, the emulsion based simulants can be used to test and evaluate a variety of spill control devices (booms, boom vanes, skimmers, weir gates, etc.) and other equipment. Further, the emulsion based oil simulants of the present invention can be used for training command, planning and operational personnel in oil spill drills and exercises.

Thus, the emulsion-based oil simulants of the present invention can be used by distributing the emulsion-based oil simulant over a preselected terrestrial surface. Upon contact with the preselected surface, at least one simulated oil property can be evaluated as mentioned herein. For example, the spreading rate of the emulsion-based oil simulant, rate of dispersion, or other useful information can be collected and analyzed.

EXAMPLES

The following examples illustrate exemplary embodiments of the invention. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be practical embodiments of the invention.

Oil Simulant Preparation

A simulant composition of the invention was made in accordance with the following description. Canola oil ethyl ester was used as the oil phase. The surfactant used was deoiled lecithin (commercially available as Lecigran™ 5750 from Riceland Foods Inc., Stuttgart; AR). The oil phase comprised 2.5% (wt/wt) lecithin in solution. Deionized water was used as the dispersed phase with addition of Microbe-Plus™ to stimulate bioremediation. Microbe-Plus™ contains suitable strains of bacteria and an appropriate amount of nutrients (nitrogen, phosphorus and sulfur), and is available from Newtec in Eddyville, Ky. The composition of the emulsion based oil simulant is shown in Table 1. An exemplary composition of the synthetic medium for growth of bacteria is shown in Table 2.

TABLE 1

Composition of Simulant

| Component | Composition [weight %] | Role |
|---|---|---|
| Dionized water | 15.95 | dispersed phase |
| Microbe Plus | 15.95 | bacteria and nutrients in 5% solution |
| Canola oil ethyl ester | 64.80 | continuous phase |
| Lecithin | 1.60 | emulsifier |
| Synthetic medium | 1.70 | source of nutrients |

TABLE 2

Chemical composition of dry preparation for growth of bacteria

| Components | Composition [weight %] | Source of |
|---|---|---|
| Ammonium chloride ($NH_4Cl$) | 66.7 | nitrogen |
| Potassium nitrate ($KNO_3$) | 11.4 | nitrogen, potassium |
| Monosodium phosphate ($NaH_2PO_4$) | 9.5 | phosphate, sodium, pH control |
| Dipotassium phosphate ($K_2HPO_4$) | 9.5 | phosphate, potassium, pH control |
| Magnesium sulfate ($MgSO_4$) | 1.9 | magnesium, sulfur |
| Calcium chloride ($CaCl_2$) | 0.9 | calcium |

Figure 1:
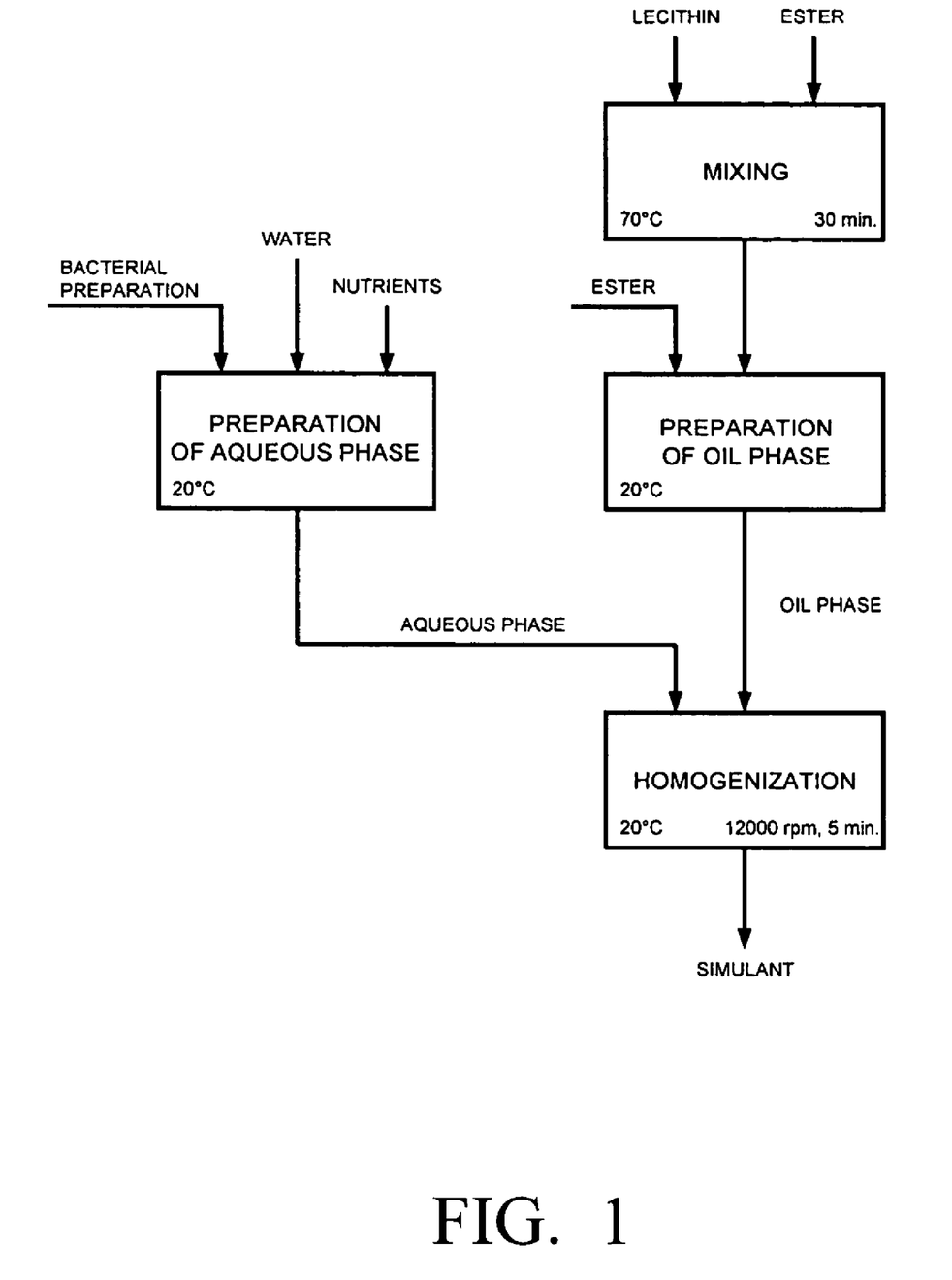
FIG. 1 is a block diagram for manufacture of an emulsion-based crude oil simulant of the invention in accordance with one embodiment of the present invention.

The procedure of forming the emulsion was as follows and corresponds generally to the Block diagram shown in FIG. 1. Initially, an emulsifier (Lecigran 5750) (3.04 g) and canola oil ethyl ester (121.7 g) were placed in a beaker and heated to 70° C. using gentle stirring until the emulsifier was completely dissolved in the oil phase. The solution of emulsifier in canola oil ethyl ester was placed in a polypropylene container. A heavy-duty laboratory homogenizer (Silverson Machine Ltd., England, Model L4R) was set at low speed to gradually disperse 60 mL of the aqueous phase (20° C.) into the oil phase. The mixture was gently mixed for 2 minutes, and subsequently for an additional 3 minutes at the maximum speed setting of 12,000 rpm.

Evaluation of Emulsion-Based Oil Simulant

Figure 2:
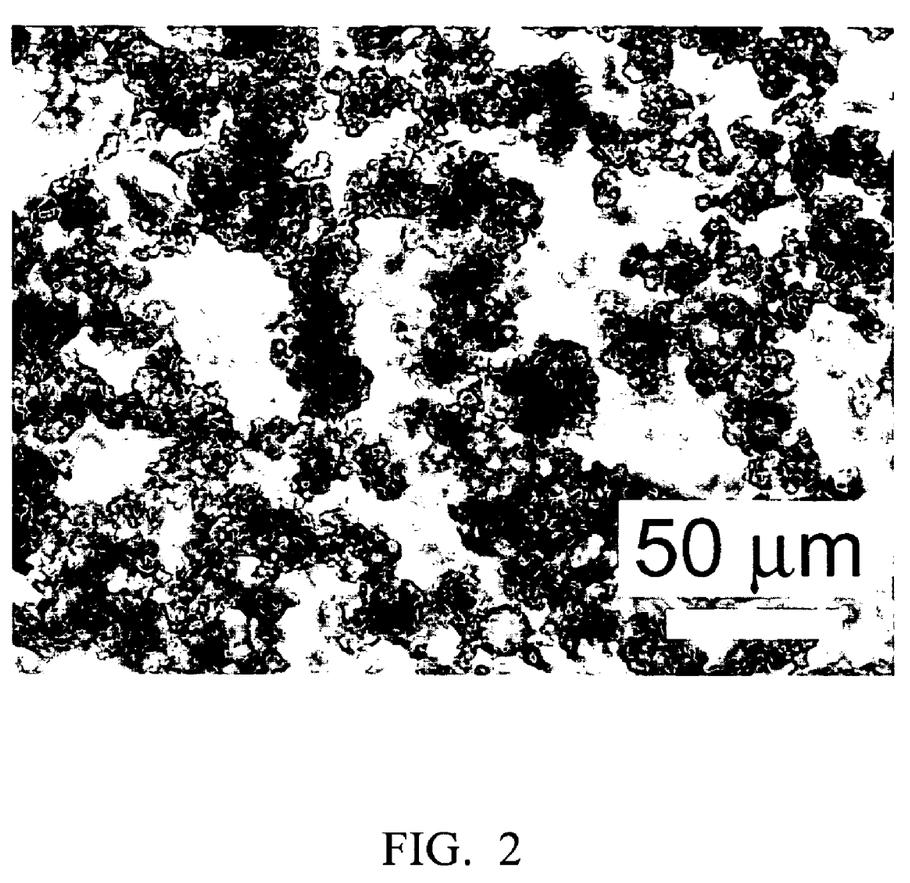
FIG. 2 is a microphotograph of the structure of a simulant of the present invention taken under an optical microscope (500×). The bar length is 50 micrometers.
Figure 3:
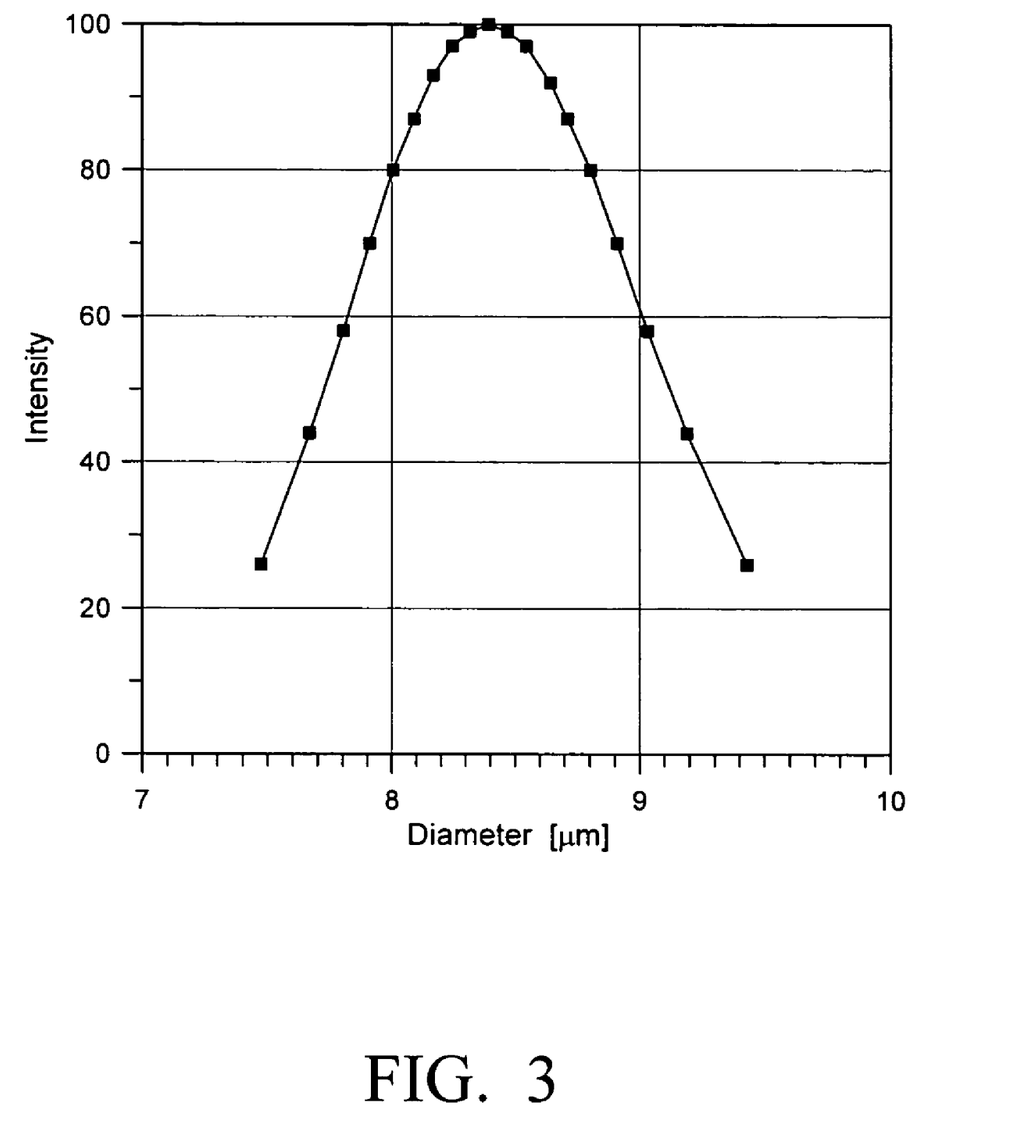
FIG. 3 is a graph showing droplet size distribution of the dispersed phase of a simulant of the present invention.

The morphology of the resulting emulsion resembles a network composed of individual droplets as shown in the photomicrograph of FIG. 2. The appearance of the dispersion is caused by attractive forces between aqueous droplets mitigated by the emulsifier. The droplet size distribution of the emulsion prepared in the described way was measured using a zeta potential and particle size analyzer, Brookhaven Instruments Corp. (Model ZetaPALS). The measured size distribution is shown in FIG. 3 which illustrates that the droplet size distribution is very narrow with the mean droplet size equal to 8.4 micrometers.

Figure 4:
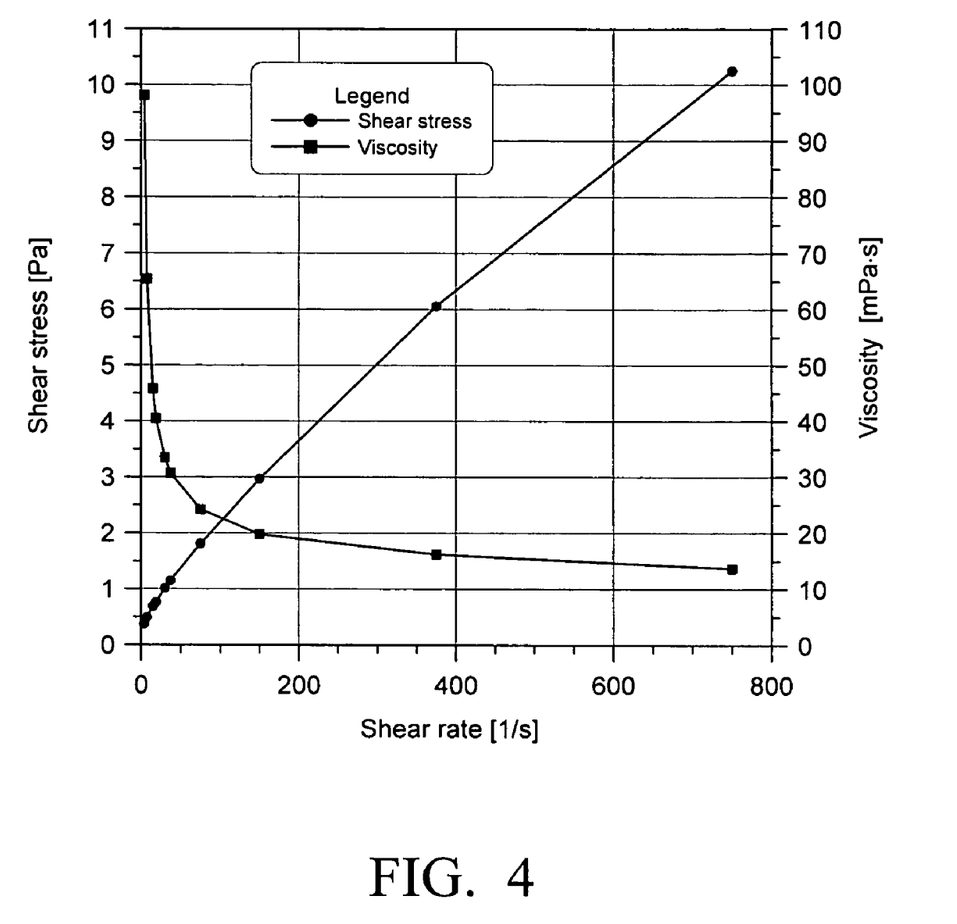
FIG. 4 is a graph showing the change in shear stress and viscosity versus shear rate for a simulant of the present invention.
Figure 5:
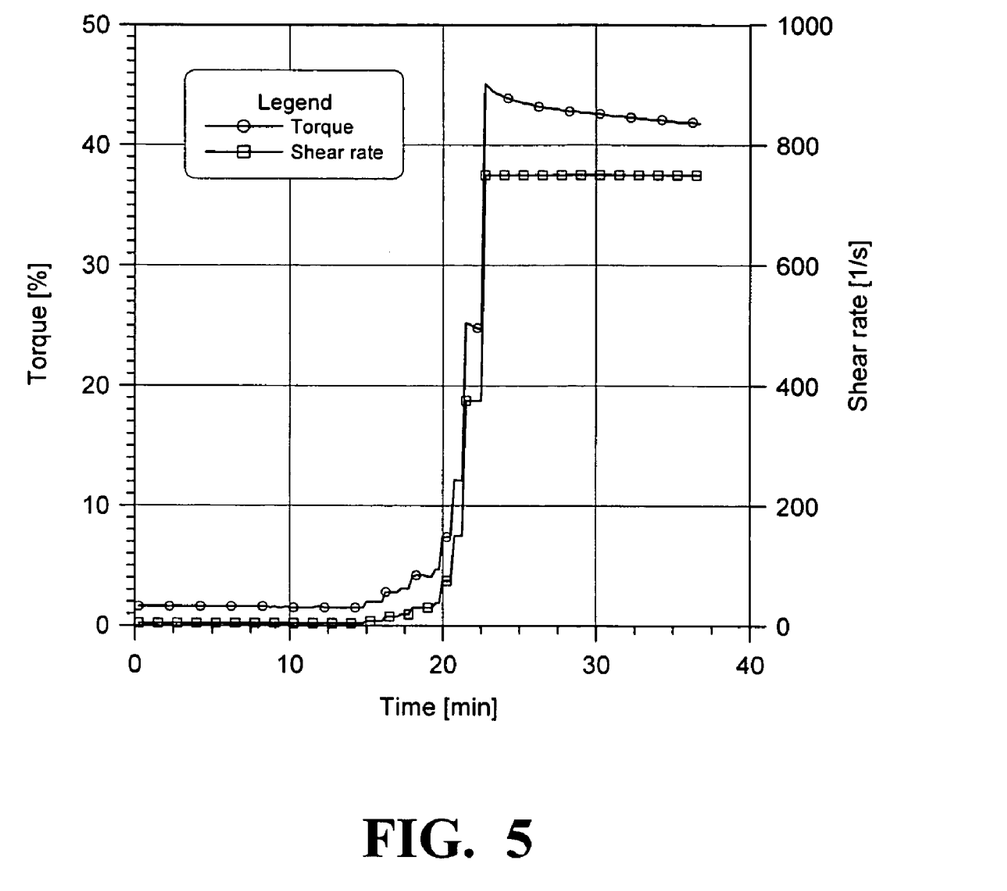
FIG. 5 is a graph showing changes in torque with time for an embodiment of the present invention.

The rheological behavior of the emulsion-base simulant was studied at 25.8° C. to 60.18° C. with a controlled stress digital rheometer (Brookfield model DV-II+). The applied shear rate range was from 3.75 $s^{-1}$ to 750 $s^{-1}$. The WIN-GATHER software program was used to collect and analyze the data as presented in FIG. 4 through 5. The emulsion based oil simulant behaved as a non-Newtonian fluid. The shear stress and viscosity of the emulsion decreases as the shear rate increases as shown in FIG. 4. The shear rate was inversely proportional to viscosity which indicates a pseudoplastic fluid. If water occupies a significant volume in the dispersion, viscosity of the emulsion will tend to be greater than if the contribution of the dispersed phase is smaller. Aggregation of the dispersed phase also results in shear-thinning flow. At low shear rates, the aggregates become deformed but remain essentially intact. As the shear rate is increased, the aggregates may be broken down into individual droplets, decreasing the friction and viscosity. All samples exhibit thixotropic properties, i.e. viscosity decreases with time. Changes of torque with time for the sample are shown in FIG. 5. A change in the fluids viscosity (torque) over time is higher for higher shear rates.

A certain amount of force must be applied to the fluid before any flow is induced for the sample (FIG. 4) and is referred to as the "yield value." This behavior is characteristic for plastic flow. A fluid system displays a yield value if interactions among droplets are strong. The magnitude of the yield value depends on the force required to break these bonds.

An emulsion simulant having a lower viscosity can be produced by dilution of more concentrated emulsion with the oil phase. Similarly, an emulsion simulant having a higher viscosity can be obtained by using a greater amount of the aqueous phase. This relationship between the simulant viscosity and the aqueous phase content is shown in Table 3. With an increase in the amount of the dispersed phase in the emulsion, viscosity of the simulant also increases.

TABLE 3

Rheological properties of simulant

| Parameter | Amount of aqueous phase in simulant [% by vol.] | | |
|---|---|---|---|
| | 20 | 30 | 40 |
| Plastic viscosity, mPa · s | 11.4 | 18.5 | 76.3 |
| Yield Stress, N/m$^2$ | 0.162 | 0.515 | 0.131 |
| Confidence of fit, % | 93.1 | 88.1 | 78.7 |

These rheological properties correlate to those of typical crude oil in most relevant circumstances.

Biodegradability of the Simulant Fluids and Crude Oil in the Aquatic Environment The biodegradability of oil simulants (Simulant Fluid 1.2, Simulant Fluid 2.0 as described below) and crude oil was examined by the $CO_2$ evolution method (EPA 560/6-82-003). The EPA method is based on "ultimate biodegradability." Under aerobic conditions and nutrient supply (phosphorus, nitrogen), microorganisms can metabolize a hydrocarbon substance to $CO_2$, water, and oxides or mineral salts of other elements. The $CO_2$ evolution test indirectly measures the disappearance of an organic substance. Carbon dioxide is presumed to be the prevalent indicator of organic compound breakdown and should be proportional to the biodegradation rate. Accordingly, if the test substance is the only source of carbon, the amount of $CO_2$ evolved is proportional to the carbon digested by microorganisms.

The PERC biodegradation test was patterned after U.S. Environmental Protection Agency standard method (EPA 560/6-82-003) for determining biodegradability of chemical substances. The test consisted of a 2-week inoculum buildup period and a 4-week biodegradation test. A brief review of the method is described below.

Figure 6:
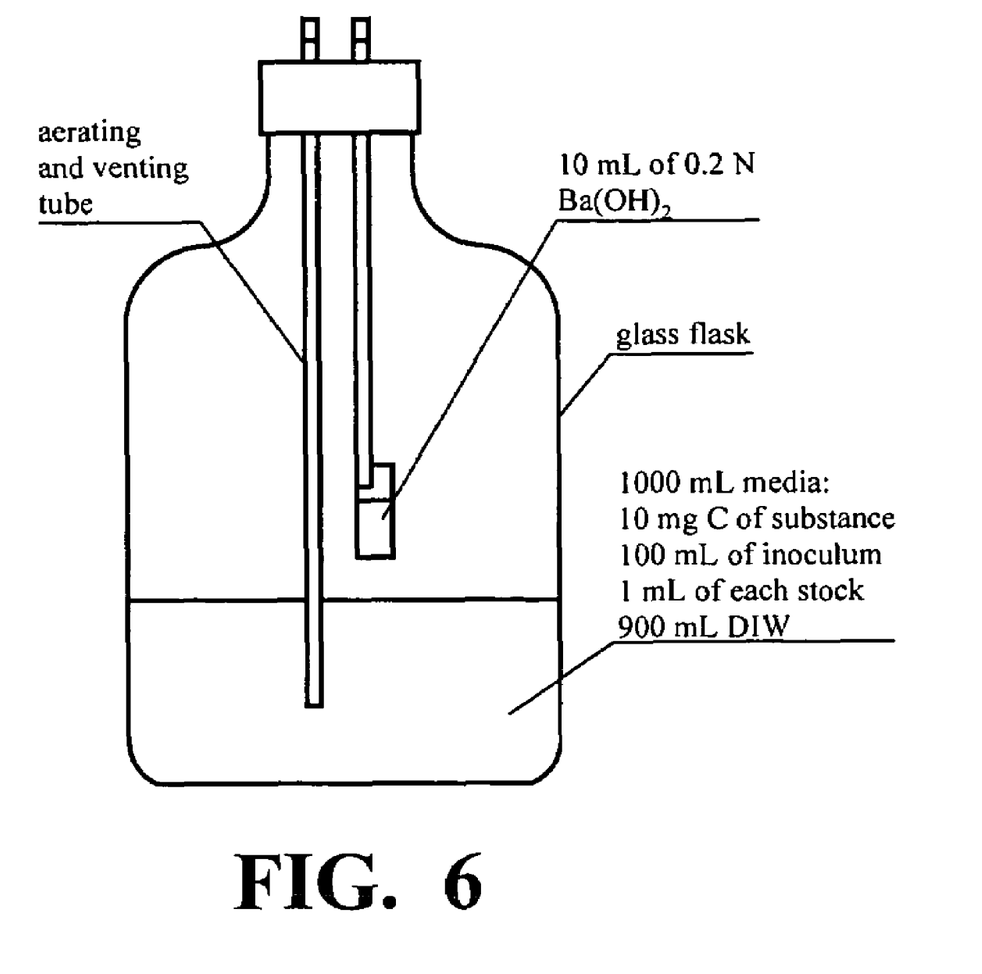
FIG. 6 is a flask assembly for measuring biodegradation of emulsion-based oil simulants in accordance with the present invention.

The biodegradability tests were performed in glass flasks equipped with an open reservoir for $Ba(OH)_2$ solution and vent tube for sampling and aeration (FIG. 6). The reservoir was filled with 10 mL of barium hydroxide solution to trap the $CO_2$, in the form of sediment of $BaCO_3$, released during digestion of the test compound. The flasks contained 900 mL distilled deionized water (DIW), 100 mL of inoculum (acclimation medium), 1 mL of each stock solution (Table 4), and 10 mg/L carbon from the test compound. After preparation of the inoculum, the test flasks were sparged with $CO_2$-free air to ensure that the trapped $CO_2$ is only from the metabolizing of the test compounds by the microorganism. The $CO_2$ was removed from air by passage of compressed air through a series of three 4-L bottles each containing 3000 mL of 5 M NaOH. The flasks were sealed and incubated while stirring in the dark to minimize both photochemical and algal growth.

The inoculum was prepared by adding one gram of organic matter rich soil, 2 mL of fresh, activated (aerated) mixed liquor obtained from the Salt Lake City Reclamation Plant on Jul. 23, 2003, 1 mL each of solutions I, II and III (Table 4), 25 mg/L Difco vitamin-free casamino acids (Difco Laboratories, Mauston, Wis.), 25 mg/L of yeast extract (Acros Organics N.V., Fair Lawn, N.J.) to 1000 mL DIW.

TABLE 4

Medium employed for assay of $CO_2$ evolution from EPA (1992)

| Solution | Compound | Concentration [g/L] |
|---|---|---|
| I | NH$_4$Cl | 35 |
| | KNO$_3$ | 15 |
| | K2HPO$_4$•3H$_2$O | 75 |
| | NaH$_2$PO•4H$_2$O | 25 |
| II | KCl | 10 |
| | MgSO$_4$ | 20 |
| | FeSO$_4$•7H$_2$O | 1 |
| III | CaCl$_2$ | 5 |
| | ZnCl$_2$ | 0.05 |
| | MnCl$_2$•4H$_2$O | 0.5 |
| | CuCl$_2$ | 0.05 |
| | CoCl$_2$ | 0.001 |
| | H$_3$BO$_3$ | 0.001 |
| | MoO$_3$ | 0.0004 |

Each test substance was added at concentration equivalent to 4, 8 and 8 mg carbon/L by calculation on days 0, 7 and 11, respectively. At day 14, the inoculum was filtered through glass wool. The separated inoculum was prepared for Simulant Fluid 1.2, Simulant Fluid 2.0 and Alaska North Slope Crude Oil.

The total organic carbon (TOC) content of the test substances was analyzed with a micro-elemental analyzer LECO CHNS-932. Results of the ultimate analysis are shown in Table 5. Sodium citrate was used as a reference substance. Simulant Fluid 1.2 used for these biodegradation tests was a non-emulsion crude oil simulant composed of 85 vol % canola oil and 15 vol % of a terpene. Simulant Fluid 2.0 was an emulsion based crude oil simulant in accordance with the present invention. This emulsion base crude oil simulant was composed of 80 vol % of canola oil ethyl ester and 20 vol % of water. The continuous phase (organic phase) only was used for the biodegradation test and was composed of 97.5 weight % of canola oil ethyl ester and 2.5 weight % of lecithin. No additional nutrients and bacteria were used in formulation of the simulant.

TABLE 5

Ultimate analysis of samples

| Sample | % C | % H | % N | % S |
|---|---|---|---|---|
| Simulant Fluid 1.2 | 79.3 | 11.7 | 0.7 | 0.1 |
| Simulant Fluid 2.0 | 76.8 | 11.9 | 0.7 | <0.1 |
| Alaska North Slope Crude Oil | 85.5 | 12.1 | 1.4 | 0.9 |

The amount of $CO_2$ released during the test was measured by titration of the entire $Ba(OH)_2$ solution (10 mL of $Ba(OH)_2$ plus 10 mL of rinse water) with 0.1 M HCl to the phenolphthalein end point. After sampling, the reservoir was refilled with fresh $Ba(OH)_2$. All of the samples were analyzed at least 5 times in a 28-day period to provide sufficient data for characterization of biodegradation with time. Three mL of 20% $H_2SO_4$ were added on the day prior to terminating the test to release carbonate bound $CO_2$. The percent theoretical $CO_2$ evolved from the test substances was calculated from Equation 1.

$$\% \ CO_2 \ evolution = \frac{TF - CF}{C} \cdot 100\% \quad \text{Equation 1}$$

where TF is mL of 0.1 N HCl required to neutralize the $Ba(OH)_2$ from the flask containing the test compound, CF is mL of 0.1 N HCl required to neutralize the $Ba(OH)_2$ from the control flask, and C is the volume of the HCl required to titrate the theoretical amount of $CO_2$ converted from the total carbon contained in the test substance.

Results

Figure 7:
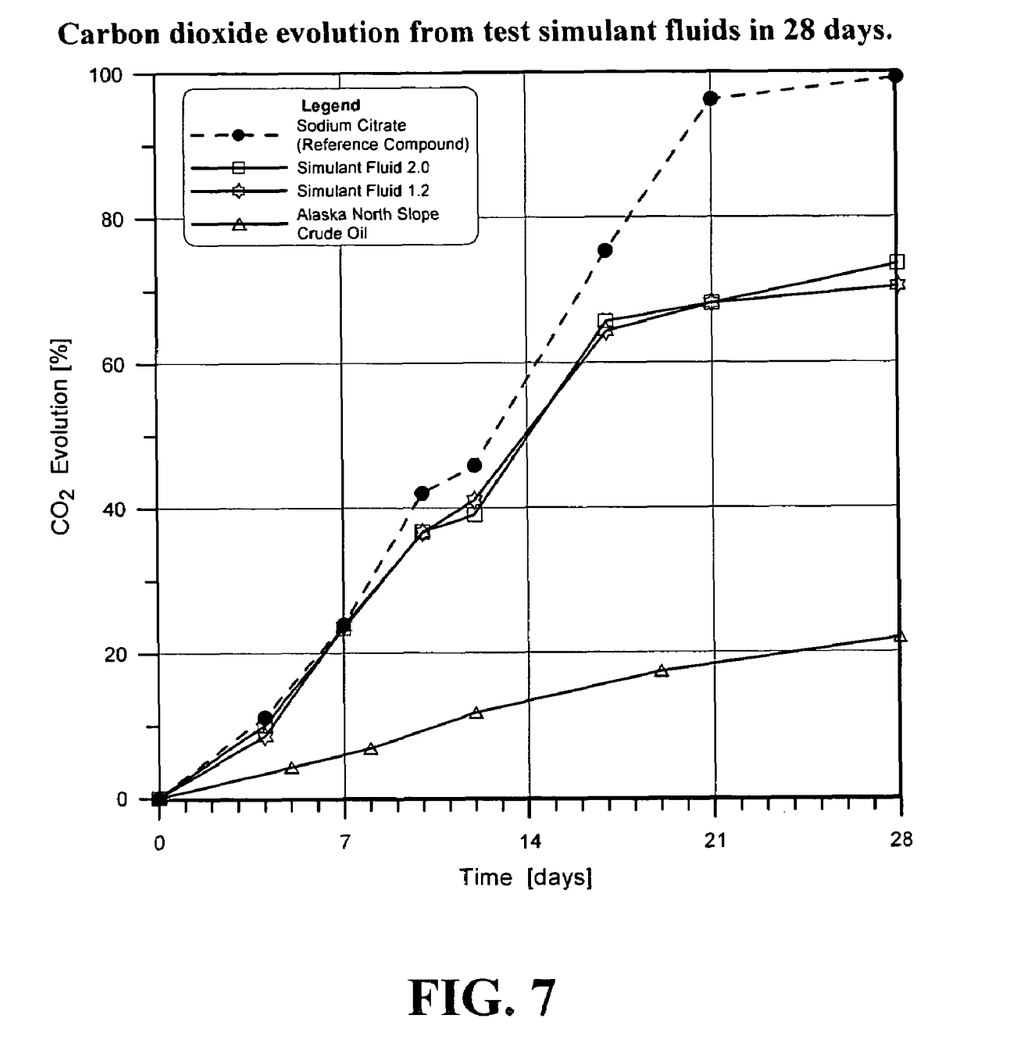
FIG. 7 is a graph showing $CO_2$ evolution from several test fluids over a period of 28 days.

The average cumulative percent theoretical $CO_2$ evolution from the two simulants and crude oil, tested in triplicate as required by the method, in 28 days is presented in FIG. 7 and Table 6. The maximum $CO_2$ evolution values from Simulant Fluid 1.2 and Simulant Fluid 2.0 were between 70.5 and 73.6%. The reference compound, sodium citrate was almost completely digested after 28 days (99.2% $CO_2$ evolution). The $CO_2$ evolution value from Alaska North Slope Crude Oil was 22% after four weeks.

TABLE 6

$CO_2$ evolution from test substance in 28 days*

| | $CO_2$ Evolution [%] | | | |
|---|---|---|---|---|
| Time [days] | Reference Compound | Alaska North Slope Crude Oil | Simulant Fluid 1.2 | Simulant Fluid 2.0** |
| 0 | 0 | 0 | 0 | 0 |
| 4 | 11.1 | — | 10.0 | 8.5 |
| 5 | — | 5.2 | — | — |
| 7 | 23.9 | — | 23.4 | 23.7 |
| 8 | — | 8.9 | — | — |
| 10 | 42.0 | — | 36.7 | 36.6 |
| 12 | 45.8 | 14.4 | 39.0 | 41.0 |
| 17 | 75.4 | — | 65.7 | 64.3 |
| 19 | — | 17.4 | — | — |
| 21 | 96.2 | — | 68.2 | 68.2 |
| 28 | 99.2 | 22.0 | 73.6 | 70.5 |

*The PERC biodegradation tests were patterned after U.S. Environmental Protection Agency (EPA 560/6-82-003)
**for biodegradability test was used a mixture of canola oil ethyl ester and an emulsifier, not emulsion. The composition of mixture was the same as for the Simulant Fluid 2.0

Results for the Simulant Fluid 1.2 and Simulant Fluid 2.0 show that both can be considered as a readily biodegradable fluid. It can be expected that the emulsified Simulant Fluid 2.0 should have higher biodegradability than is shown in the Table 6. The biodegradability of Simulant Fluid 2.0 can be increased by using of an additional bacterial preparation (e.g. Microbe-Plus 21) and nutrients. Additional microorganisms were not used in the above biodegradability tests.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention. Although some embodiments are shown to include certain features, it is contemplated that any feature disclosed herein may be used together or in combination with any other feature on any embodiment of the invention. It is also contemplated that any feature may be specifically excluded from any embodiment of the invention.

What is claimed is:

1. A method for making an emulsion-based oil simulant comprising mixing under high shear conditions sufficient to form an emulsion a mixture comprising an organic continuous phase, an aqueous dispersed phase, and an emulsifier, said organic continuous phase, the aqueous dispersed phase, and the emulsifier each being biodegradable; and
    adjusting a composition and content of each of the organic continuous phase, the aqueous dispersed phase, and the emulsifier to simulate a physical property of a target crude oil, said physical property including at least one of spreading rate, viscosity, rate of dispersion, and flow aggregation.

2. The method of claim 1, wherein the target crude oil is Alaskan crude oil.

3. The method of claim 1, wherein the emulsifier comprises a monoglycerol, a phospholipid, or a mixture thereof.

4. The method of claim 1, wherein the emulsifier is present in the amount of about 0.5 wt % to about 10 wt % per weight of the oil phase.

5. The method of claim 1, wherein the organic continuous phase comprises an esterified vegetable oil.

6. The method of claim 5, wherein the vegetable oil is selected from the group consisting of canola oil, soybean oil, palm oil, cottonseed oil, safflower oil, sunflower oil, corn oil, olive oil, linseed oil, and combinations thereof.

7. The method of claim 1, wherein the dispersed aqueous phase comprises water, bacteria, and nutrients.

8. The method of claim 1, wherein the aqueous dispersed phase is present in an amount from about 10 vol % to about 40 vol % and the organic continuous phase is present in an amount from about 60 vol % to about 90 vol %.

9. The method of claim 1, wherein the step of mixing occurs from about 500 rpm to about 20000 rpm.

10. An emulsion-based oil simulant, comprising:
    a) an organic continuous phase;
    b) an aqueous dispersed phase; and
    c) an emulsifier;
    the organic continuous phase, the aqueous dispersed phase, and the emulsifier being biodegradable and having a composition and content selected to form an emulsion-based oil simulant which simulates a physical property of a target crude oil, said physical property including at least one of spreading rate, viscosity, rate of dispersion, and flow aggregation.

11. The oil simulant of claim 10, wherein the emulsifier comprises a monoglycerol or a phospholipid or a mixture thereof.

12. The oil simulant of claim 11, wherein the phospholipid comprises a phosphatidylserine, phosphatidylethanolamine, phosphatidylcholine, phosphatidylglycerol, phosphatidylinositol, diphosphatidylglycerol, or a mixture thereof.

13. The oil simulant of claim 10, wherein the emulsifier is present in the amount of 0.5 to 10 wt. % per weight of the oil phase.

14. The oil simulant of claim 10, wherein the organic continuous phase comprises one or more of methyl and ethyl esters of vegetable oils.

15. The oil simulant of claim 10, further comprising bacteria in the dispersed phase to stimulate biodegradation where the bacteria is in sufficient contact with the organic continuous phase for the bacteria to degrade the organic continuous phase.

16. The oil simulant of claim 10, wherein the aqueous dispersed phase is present in an amount from about 10 vol % to about 40 vol % and the organic continuous phase is present in an amount from about 60 vol % to about 90 vol %.

17. The oil simulant of claim 10, wherein the aqueous dispersed phase is present in an amount from about 10 vol % to about 30 vol %.

18. The oil simulant of claim 10, further comprising a colorant.

* * * * *